United States Patent [19]

Matouka

[11] 3,924,195

[45] Dec. 2, 1975

[54] DIGITAL SAWTOOTH GENERATOR

[75] Inventor: Michael F. Matouka, Sterling Heights, Mich.

[73] Assignee: General Motors Corporation, Detroit, Mich.

[22] Filed: Apr. 8, 1974

[21] Appl. No.: 458,562

[52] U.S. Cl. .................. 328/181; 318/227; 328/35; 328/185; 328/186

[51] Int. Cl. .......................... H03k 4/10; H03k 3/37

[58] Field of Search ............ 307/227, 228; 318/227; 328/35, 181–186

[56] References Cited

UNITED STATES PATENTS

| | | | |
|---|---|---|---|
| 2,958,828 | 11/1960 | Schreiber | 328/186 |
| 3,628,061 | 12/1971 | Jackman | 328/186 |
| 3,676,784 | 7/1972 | Comte | 328/181 |
| 3,835,403 | 9/1974 | Leinemann | 328/186 |

*Primary Examiner*—Stanley D. Miller, Jr.
*Attorney, Agent, or Firm*—Howard N. Conkey

[57] ABSTRACT

A digital sawtooth waveform generator is disclosed for providing a motor reference signal in a cycloconverter power supply for an induction motor. A series of clock pulses at a frequency $J(F_{sync})$ is supplied to the clock input of a binary counter where J is a constant and $F_{sync}$ is the desired frequency of the input signal to the motor. Preset pulses at a frequency of $2F_{sync}$ are supplied to the binary counter whose output is applied to a variable gain digital-to-analog converter. A gain control voltage with a magnitude of $V_G$ is applied to the digital-to-analog converter whose output is a current $I_1$ with a magnitude equal to $V_G K_1 N$ where $K_1$ is a constant and N is the count of the binary counter. The current $I_1$ is summed with a current $I_2$ having a magnitude equal to $K_3 V_G$, where $K_3$ is a constant and where the currents $I_1$ and $I_2$ have opposite polarities, and a biasing current $I_3$. The summed currents form the sawtooth waveform at the frequency $2F_{sync}$. The current $I_2$ establishes a point on the sawtooth waveform about which it is compressed or expanded as the magnitude $V_G$ of the gain control voltage is varied and which is independent of the magnitude of the biasing current $I_3$.

3 Claims, 11 Drawing Figures

DIGITAL SAWTOOTH GENERATOR

This invention relates to a digital sawtooth waveform generator. Digital sawtooth waveform generators are generally known and usually take the form of a clock pulse generator, a counter and a digital-to-analog converter whose output comprises the sawtooth waveform. These known systems are generally unacceptable for use in applications such as representing the desired firing angle of controlled rectifiers in a cycloconverter circuit because of their lack of versatility and particularly in their inability to readily modify the sawtooth waveform characteristics during operation. For example, in known generators, it is not possible to vary the peak-to-peak amplitude of the sawtooth waveform to vary the firing angle range of the controlled switches and yet maintain the controlled switch firing angle representation at a specific angle of the sawtooth waveform a constant.

It is the general object of this invention to provide an improved digital sawtooth waveform generator.

It is another object of this invention to provide a digital sawtooth waveform generator for generating a sawtooth waveform which may be compressed or expanded about a preselected point on the sawtooth waveform.

It is another object of this invention to provide for a digital sawtooth waveform generator wherein the sawtooth waveform may be compressed or expanded about a preselected angle of the sawtooth waveform for all peak-to-peak amplitudes and frequencies thereof.

The digital sawtooth waveform generator of this invention includes a counter to which a series of clock pulses are applied at a frequency JF where J is a constant and F is the desired output frequency. The counter is set by preset pulses at a frequency equal to F such that the output of the counter is the binary indication of the contents of the counter between preset pulses. The output of the counter is applied to a variable gain digital-to-analog converter. A gain control voltage is generated having a magnitude $V_G$ and is applied to the digital-to-analog converter whose output is a current $I_1$ having a magnitude equal to $V_G K_1 N$ where $K_1$ is a constant and N is the count of the binary counter. This current is a stepped waveform with the magnitude of the stepped increments and the peak-to-peak amplitude being controlled as a function of the gain control voltage. The current $I_1$ is summed with a bias current $I_3$ and a current $I_2$ having a magnitude equal to $K_3 V_G$ where $K_3$ is a constant and where the currents $I_1$ and $I_2$ have opposite polarities. The summed current is the sawtooth waveform at the frequency F. The current $I_2$ establishes a point on, or angle of, the sawtooth waveform about which it is compressed or expanded as the magnitude $V_G$ of the gain control voltage is varied. The amplitude of the sawtooth waveform at this angle is controlled by the magnitude of the current $I_3$.

The objects of this invention may be best understood by reference to the following description of a preferred embodiment of this invention incorporated in a cycloconverter power supply and the Figures in which.

Figure 1:
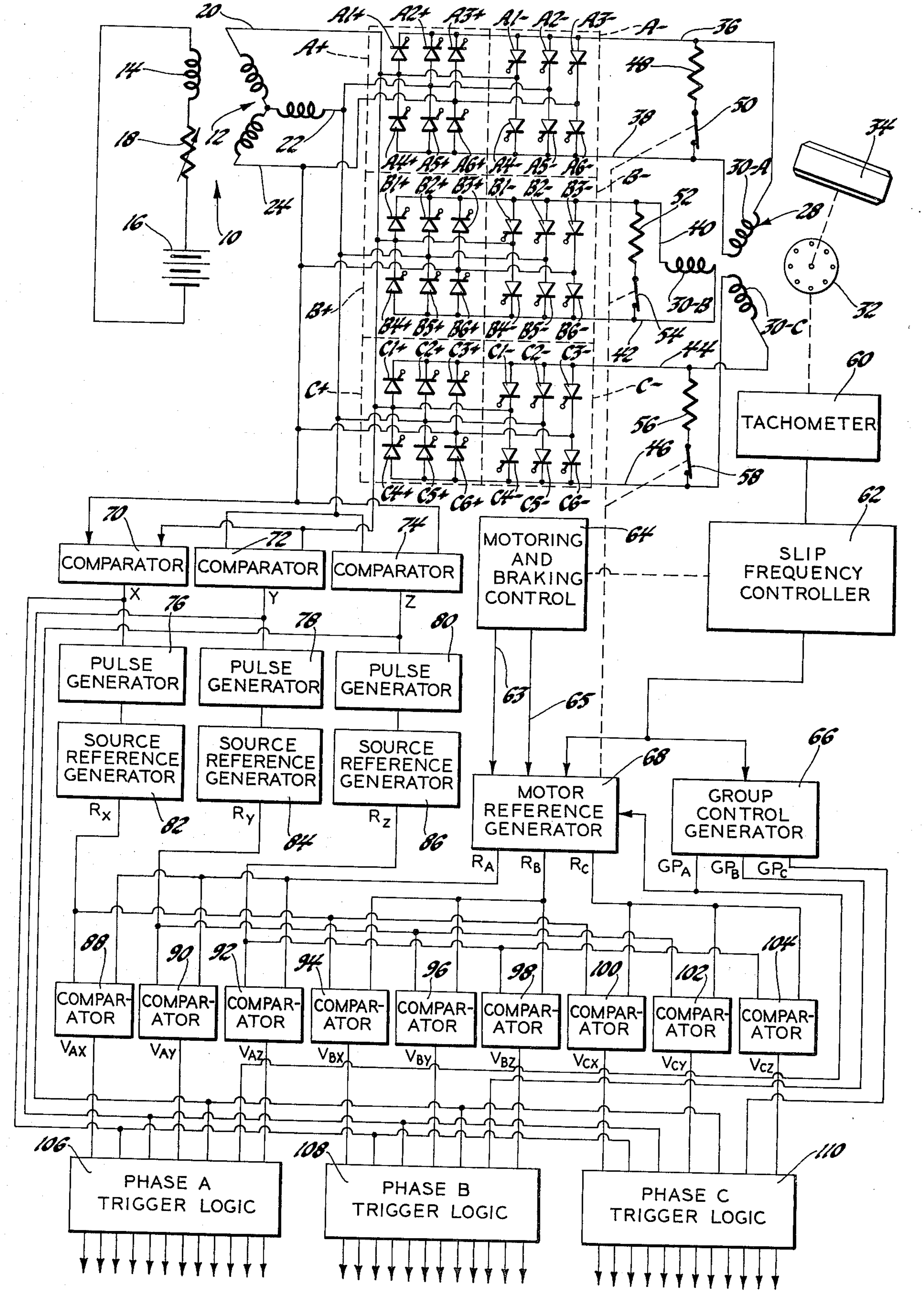
FIG. 1 is a system diagram of an induction motor power and braking system wherein the motor reference generator comprises the sawtooth waveform generator of this invention.
Figures 5, 6:
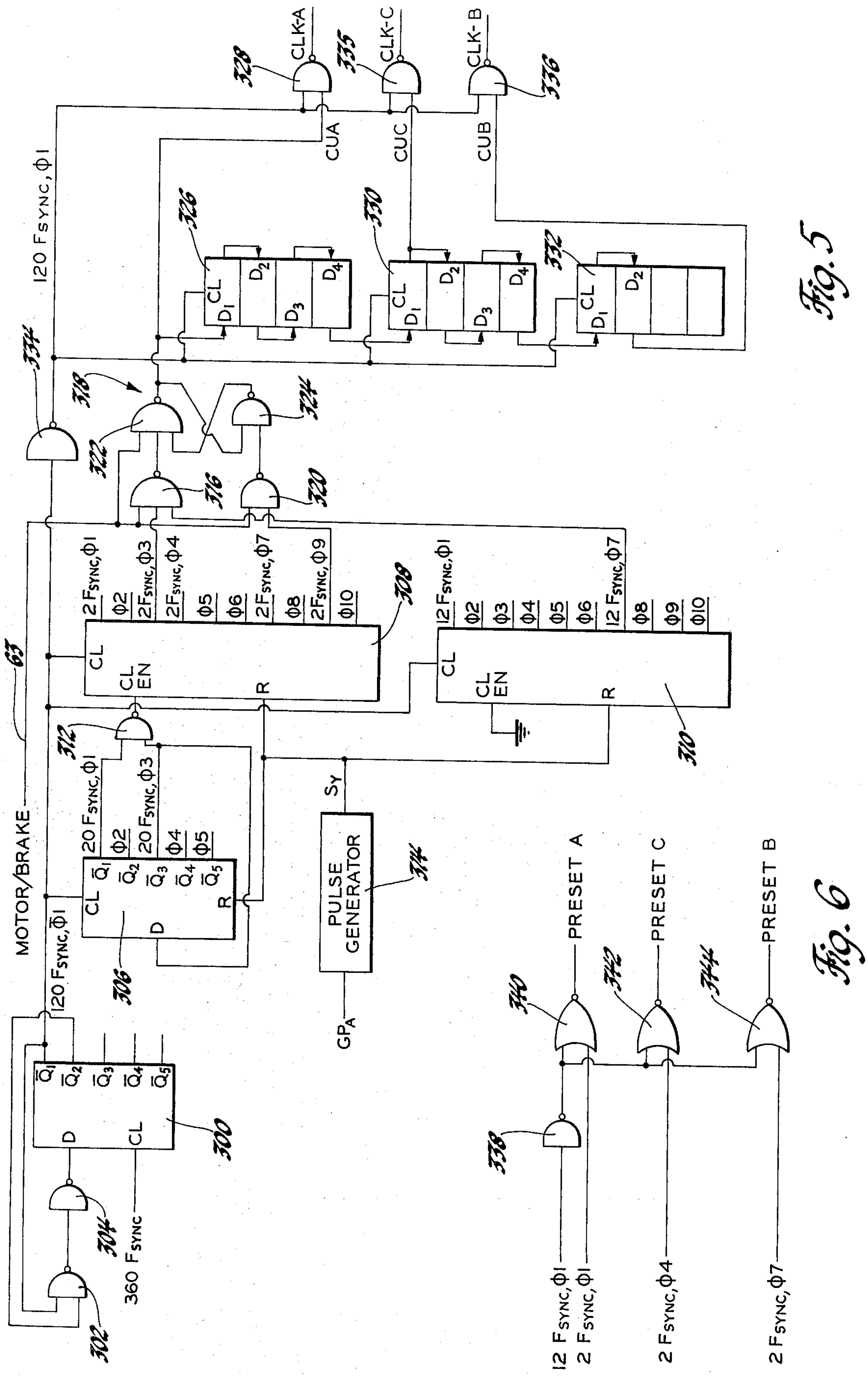
FIG. 5 is a circuit diagram of the input circuit of the motor reference generator of FIG. 1 for generating clocking signals for the phase A, B and C counters.
FIG. 6 is a logic circuit in the motor reference generator of FIG. 1 for generating preset signals for the phase A, B and C counters.
Figure 7:
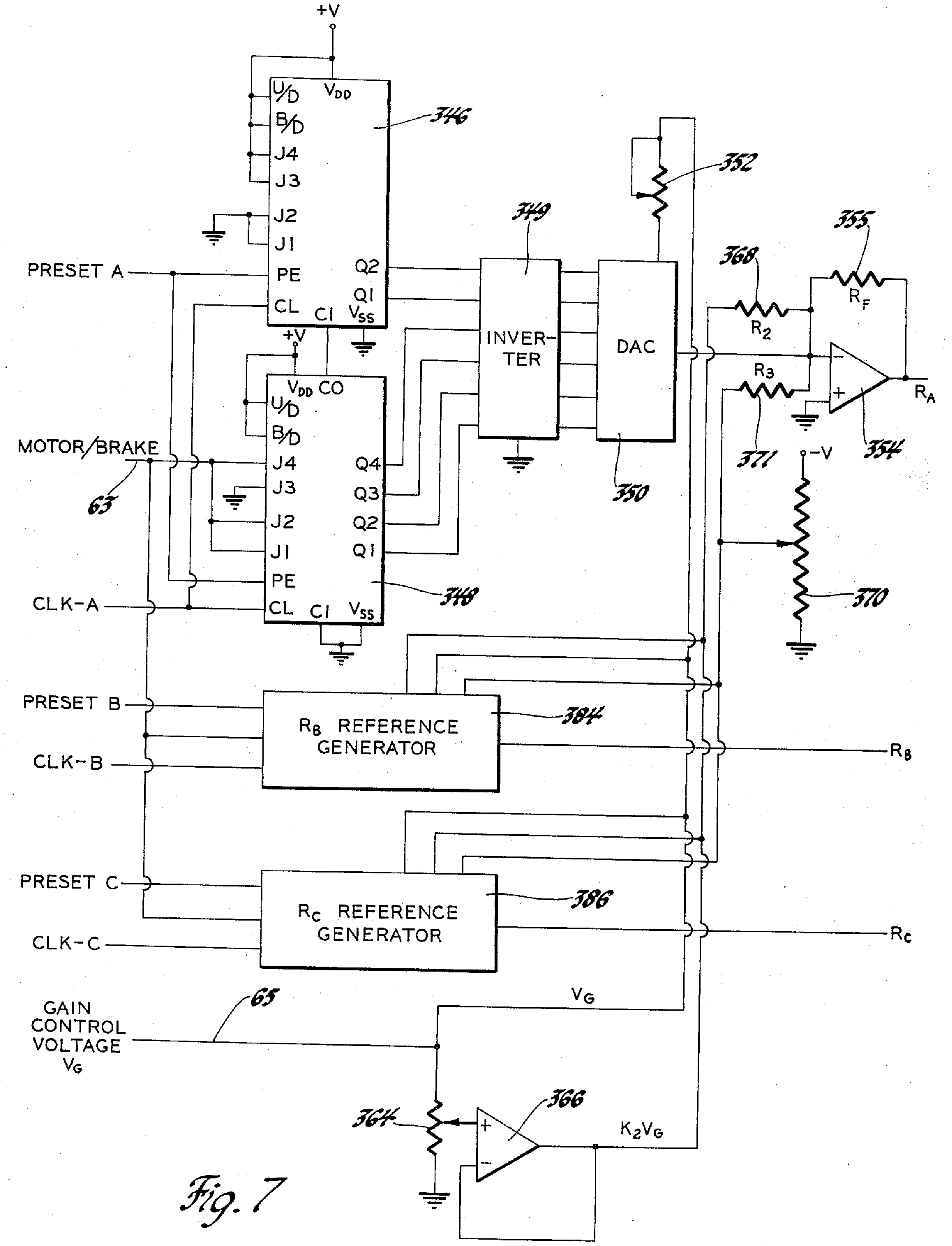
FIG. 7 is a circuit diagram of the output circuit of the motor reference generator of FIG. 1 showing the phase A, B and C counters and digital-to-analog converters.
Figure 8A:
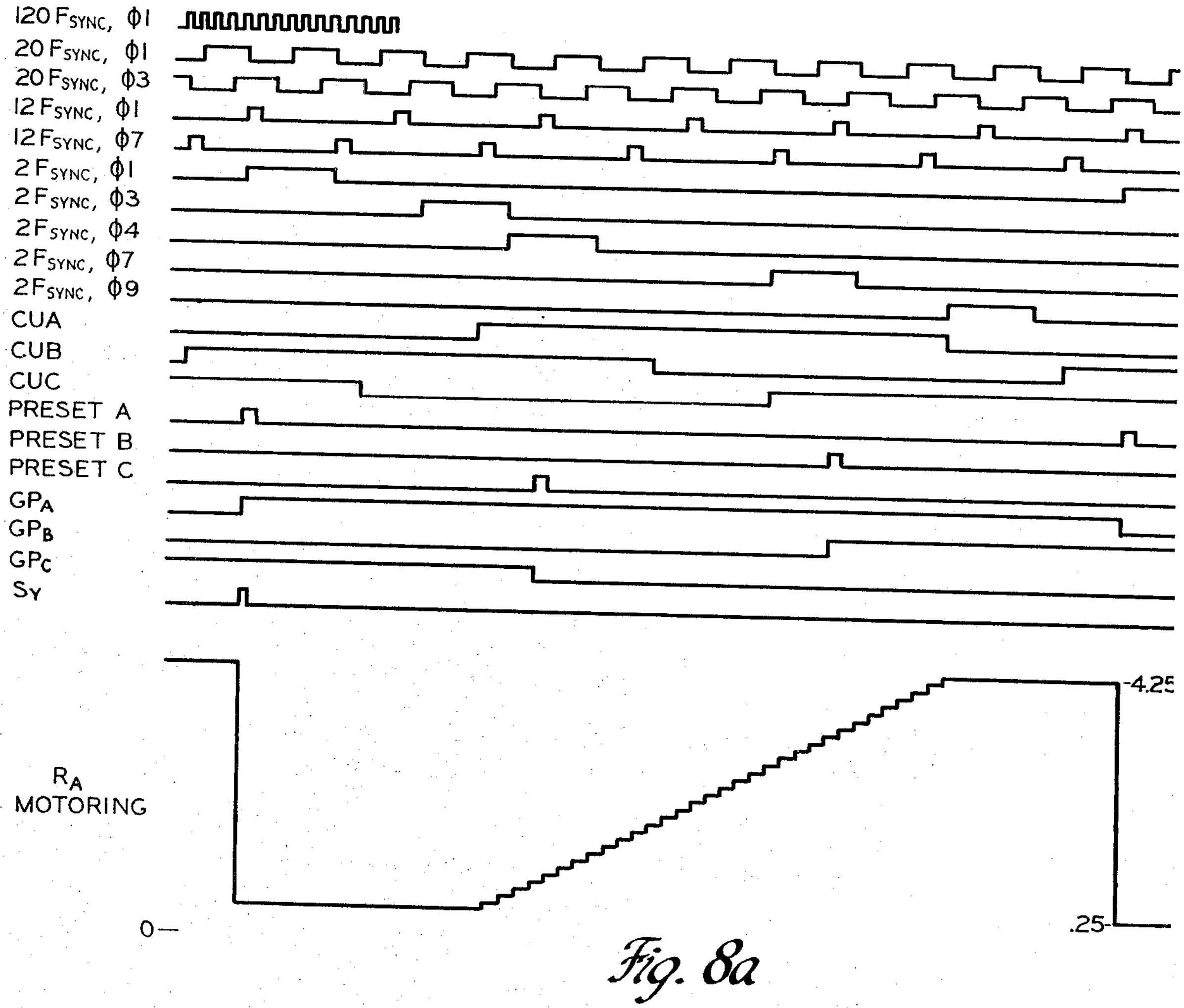
Figure 8B:
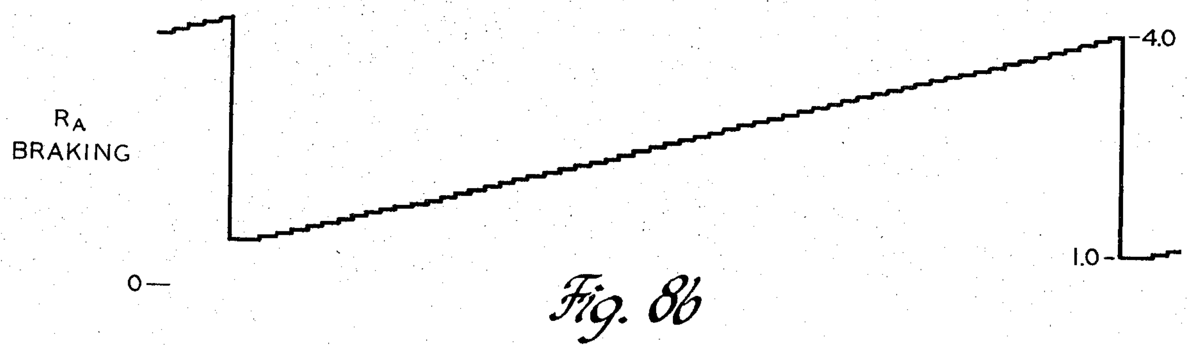
Figure 9A:
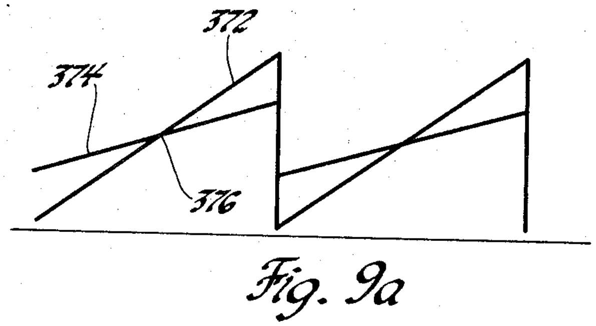
Figure 9B:
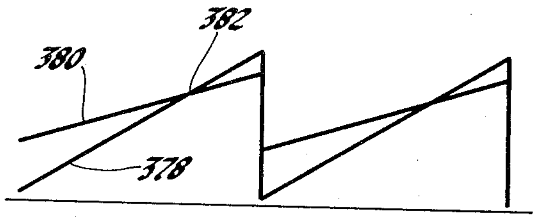

FIGS. 8*a* and 8*b* are diagrams illustrating the logic signals and the motor reference signal which are generated by the circuits of FIGS. 5, 6 and 7 during motoring and braking; and FIGS. 9*a* and 9*b* are diagrams illustrating control of the motor reference waveform by the motor reference generator of FIG. 1.

Referring to the drawings and more particularly to FIG. 1, there is illustrated an electric propulsion system for a vehicle which includes a source of polyphase alternating current generally designated by reference numeral 10. This source of alternating current is a three-phase Y-connected generator having an output winding 12 and a field winding 14. The field winding 14 is serially connected with a source of direct current 16 through a variable resistor 18. The variable resistor 18 provides for regulation of the current through the field winding 14 to thereby regulate the output voltage of the output winding 12. It is understood that the variable resistor 18 merely illustrates various field current control devices which could take a variety of forms such as a transistor voltage regulator.

The system to be described may be used for the electric propulsion of a vehicle such as an earthmover in which case the field winding 14 would be carried by the generator rotor (not illustrated) and driven by a prime mover such as a turbine or diesel (not illustrated). It is understood that the source of alternating current could be a three-phase commercial power source if the present invention were incorporated in a motor control system in a manufacturing facility.

Figure 2:
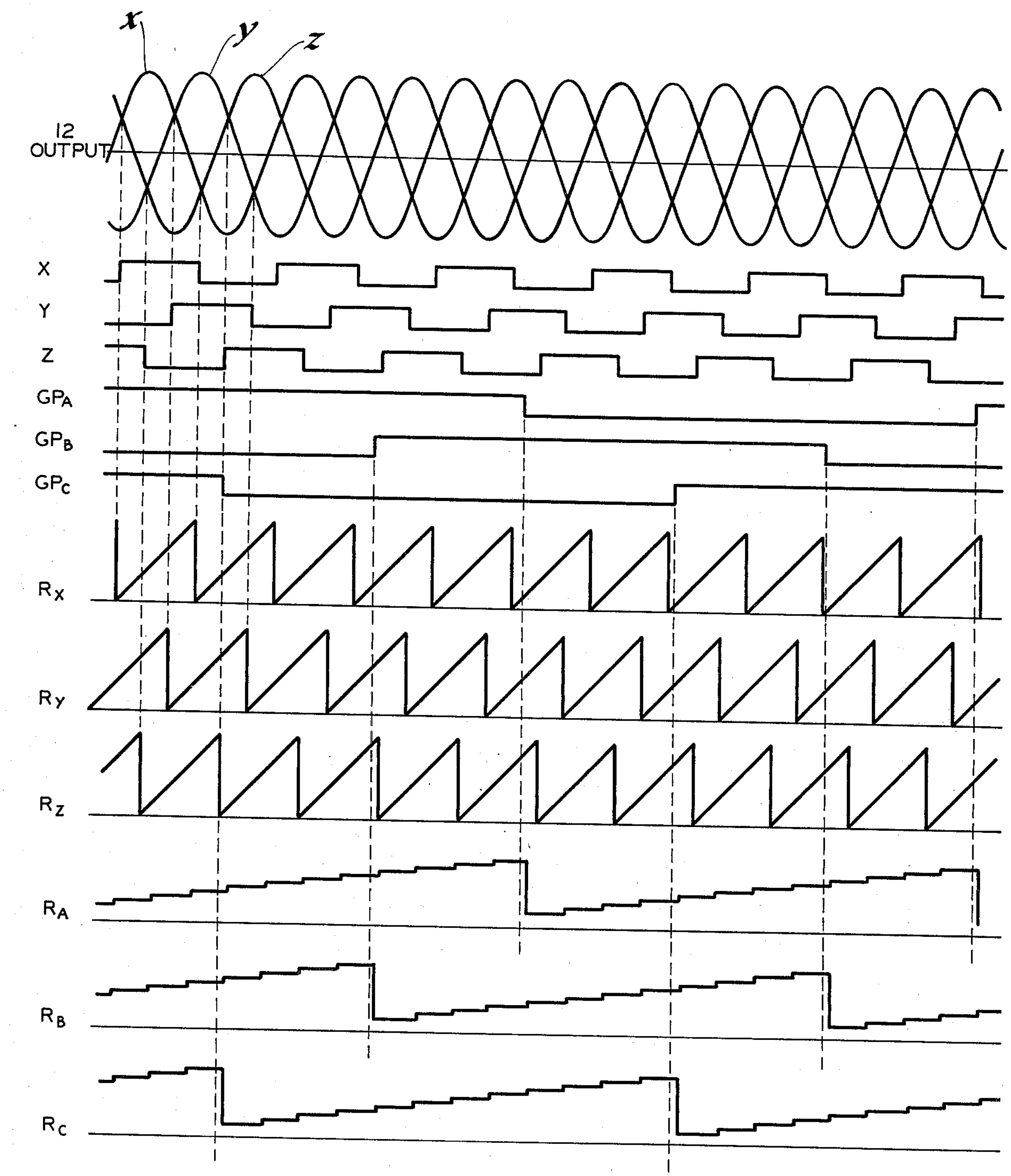
FIG. 2 is a diagram illustrating various voltage waveforms and their timed relationship as developed by the system of FIG. 1.

The output of the winding 12 comprises a three-phase line-to-neutral voltage having phases *x*, *y* and *z*, as illustrated in FIG. 2, applied respectively to output conductors 20, 22 and 24. The frequency and amplitude of this three-phase voltage is determined by the operating conditions of the alternating current source 10. For purposes of the following discussion, the frequency and magnitude of the phase voltage *x*, *y* and *z* are assumed to be constant.

In the earthmover application, a three-phase induction motor 28 is used having phase windings 30-A, 30-B and 30-C to which a three-phase voltage having phases A, B and C is applied to provide drive power for vehicle propulsion. The induction motor 28 includes a rotor 32 which is coupled to a vehicle wheel 34 to drive the vehicle. The coupling between the rotor 32 and the wheel 34 may include a mechanical differential or other coupling means. In addition, it is understood that each wheel may be driven by a separate motor or a plurality of wheels may be driven from a single motor. The cycloconverter includes six groups of controlled rectifiers A+, A−, B+, B−, C+ and C−, the groups being comprised of controlled rectifiers A1+ through A6+, A1− through A6−, B1+ through B6+, B1− through B6−, C1+ through C6+ and C1− through C6− respectively and each being connected in a full wave bridge rectifier configuration with the conductors 20, 22 and 24 being connected to respective inputs of each bridge.

The outputs of the two groups of controlled rectifiers A+ and A− are connected to the phase winding 30—A of the induction motor 28 via conductors 36 and 38. The set of controlled rectifiers A1+, A2+ and A3+ are poled to supply current to the phase winding 30—A via the conductor 36, the set of controlled rectifiers A4+, A5+ and A6+ are poled to return current from the phase winding 30-A to the winding 12 via the conductor 38, the set of controlled rectifiers A1−, A2− and A3− are poled to return current from the phase winding 30-A to the winding 12 via the conductor 36 and the set of controlled rectifiers A4−, A5− and A6− are poled to supply current to the phase winding 30—A via the conductor 38. By controlling the firing angles of the controlled rectifiers in the A+ and A− groups relative to the line-to-line voltages from the winding 12, as will be described, the phase A voltage is generated and supplied to the phase winding 30-A.

In like manner, the outputs of the two groups of controlled rectifiers B+ and B− are connected to the phase winding 30-B via the conductors 40 and 42 and the outputs of the two groups of controlled rectifiers C+ and C− are connected to the phase winding 30-C via the conductors 44 and 46.

A braking grid resistor 48 is series connected with a contactor 50 across the conductors 36 and 38, a braking grid resistor 52 is series connected with a contactor 54 across the conductors 40 and 42 and a braking grid resistor 56 is series connected with a contactor 58 across the conductors 44 and 46. When it is desired to operate the induction motor 28 for motoring, the contactors 50, 54 and 58 are opened. Conversely, when it is desired to operate the induction motor 28 as a brake, the contactors 50, 54 and 58 are closed to connect the braking grid resistors 48, 52 and 56 in parallel with the respective phase winding 30-A, 30-B and 30-C.

To provide for motoring or braking, the six groups of controlled rectifiers A+, B−, B+, B−, C+ and C− are controlled so as to apply the three-phase voltage having phases A, B and C to the respective phase windings 30-A, 30-B and 30-C.

The induction motor 28 is operated at a controlled slip frequency during motoring and braking with the desired frequency input $F_{sync}$ to the phase windings 30-A, 30-B and 30-C being determined by means of a tachometer 60, a slip frequency controller 62 and a motoring and braking control 64. The tachometer 60 is mechanically associated with the rotor 32 of the induction motor 28 and is responsive to the rotation thereof for generating a series of voltage pulses having a frequency $J(F_m)$, where J is a constant and $F_m$ divided by the number of motor pole pairs is the rotational speed of the rotor 32. The tachometer 60 can take a variety of known forms including a toothed wheel and a pickup coil.

The output voltage pulses from the tachometer 60 are supplied to the slip frequency controller 62 which, under the control of the motoring and braking control 64 generates a series of voltage pulses having a frequency $J(F_{sync})$ where $F_{sync} = F_m + F_{slip}$ and $F_{slip}$ is the desired slip frequency of the induction motor 28. When the induction motor 28 is used for motoring, the slip frequency $F_{slip}$ is positive and when the induction motor 28 is being operated as a brake, the slip frequency $F_{slip}$ is a negative value. The motoring and braking control 64 controls the slip frequency controller 62 to provide for the positive or negative slip as a function of vehicle operator demand. In addition, the motoring and braking control 64 functions in response to operator demand during braking to close the contactors 50, 54 and 58. The aforementioned functions of the slip frequency controller 62 and the motoring and braking control 64 may be accomplished as illustrated in the U.S. Pat. Salihi et al. No. 3,688,171 which issued on Aug. 29, 1972 and which is assigned to the assignee of this invention. The motoring and braking control 64 further functions in response to operator demand to supply a logic 1 signal for motoring and a logic 0 signal for braking on an output line 63 and to supply a gain control signal having a magnitude $V_G$ representing a desired braking or motoring demand on an output line 65.

The voltage pulses from the slip frequency controller 62 at the frequency $J(F_{sync})$ is supplied to a group control generator 66 and a motor reference generator 68 comprising the sawtooth waveform generator of this invention.

The group control generator 66 is responsive to the voltage pulses supplied thereto for generating three group signals $GP_A$, $GP_B$ and $GP_C$ as illustrated in FIG. 2, each of which is a square wave at the desired frequency $F_{sync} = F_m + F_{slip}$ and further which are displaced 120° from one another. The group control generator 66 may take the form of counters and appropriate logic elements to generate the three group signals $GP_A$, $GP_B$ and $GP_C$. The group signal $GP_A$ is further supplied to the motor reference generator 68 to synchronize the operation of the motor reference generator 68 with the group signals $GP_A$, $GP_B$ and $GP_C$.

The motor reference generator 68 generates three motor reference signals $R_A$, $R_B$ and $R_C$ each having a period equal to 180° of the desired input voltage to the induction motor 28 and consequently equal to 180° of the group reference signals $GP_A$, $GP_B$ and $GP_C$ and each having a fast falling trailing edge at the beginning of each period. Each of the motor reference signals $R_A$, $R_B$ and $R_C$ takes the form of a series of sawtooth waveforms of the conventional type during braking or of the truncated type during motoring. For purposes of illustration, it will hereinafter be assumed that the induction motor 28 is being operated as a brake so that the motor reference signals $R_A$, $R_B$ and $R_C$ are sawtooth waveforms of the conventional type as illustrated in FIG. 2.

The instantaneous amplitude of each of the motor reference signals $R_A$, $R_B$ and $R_C$ represents the desired firing delay angle of controlled rectifiers in the respective group pairs A+ and A−, B+ and B−, C+ and C−. The group signal $GP_A$ supplied to the motor reference generator 68 functions to synchronize the motor reference signals $R_A$, $R_B$ and $R_C$ with the group signals $GP_A$, $GP_B$ and $GP_C$ respectively, as seen in FIG. 2, so that the period of each motor reference signal $R_A$, $R_B$ and $R_C$ substantially coincides with each 180° segment of the respective group reference signal $GP_A$, $GP_B$ and $GP_C$. As seen in FIG. 2, the motor reference signals $R_A$, $R_B$ and $R_C$ are digitally synthesized sawtooth waveforms each having a fast falling trailing edge occurring within a short time period following each 180° segment of the corresponding group signal $GP_A$, $GP_B$ or $GP_C$. The fast falling trailing edge of the motor reference signals $R_A$, $R_B$ and $R_C$ make possible the smooth transition of load current between each of the pairs of controlled rectifier groups associated with each phase winding of the induction motor 28.

Conductors 20 and 24 connect phase voltages *x* and *z* to respective inputs of a comparator 70, conductors 20 and 22 connect phase voltages *x* and *y* to respective inputs of a comparator 72 and conductors 22 and 24 connect phase voltages *y* and *z* to respective inputs of a comparator 74. The comparators 70, 72 and 74 generate respective square wave signals X, Y and Z illustrated in FIG. 2 which are in synchronism with the zero voltage crossings between the conductors 20 and 24, 20 and 22, and 22 and 24 respectively. Each state of the square wave signals X, Y and Z represents the firing angle range of a respective controlled rectifier in each of the groups A+, A−, B+, B−, C+ and C−. The square wave signals X, Y and Z are connected to respective pulse generators 76, 78 and 80. The pulse generators 76, 78 and 80 are responsive to the square wave signals X, Y and Z for producing a positive voltage pulse upon each leading and trailing edge of the respective square wave signals X, Y and Z. The pulse output of the pulse generators 76, 78, and 80 are connected to respective source reference generators 82, 84 and 86.

The source reference generators 82, 84 and 86 are responsive to the pulse inputs thereto for generating three-phase source reference signals $R_X$, $R_Y$ and $R_Z$ comprised of series of sawtooth waveforms of the conventional type which are in synchronism with zero line-to-line voltage crossovers of the voltages between the conductors 20 and 24, 20 and 22, and 22 and 24 respectively as seen in FIG. 2. These sawtooth source reference signals $R_X$, $R_Y$ and $R_Z$ have a constant peak amplitude at all frequencies of the output of the source of alternating current 10. The instantaneous magnitude of each of the sawtooth waveforms in the source reference signals $R_X$, $R_Y$ and $R_Z$ is proportional to the firing delay angle of respective controlled rectifiers in the controlled rectifier groups A+, A−, B+, B−, C+ and C−. The source reference generators 82, 84 and 86 each may take the form of the sawtooth generator described in the U.S. Pat. Salihi et al. No. 3,659,168 which issued on Apr. 25, 1972 and which is assigned to the assignee of the present invention.

Figure 4:
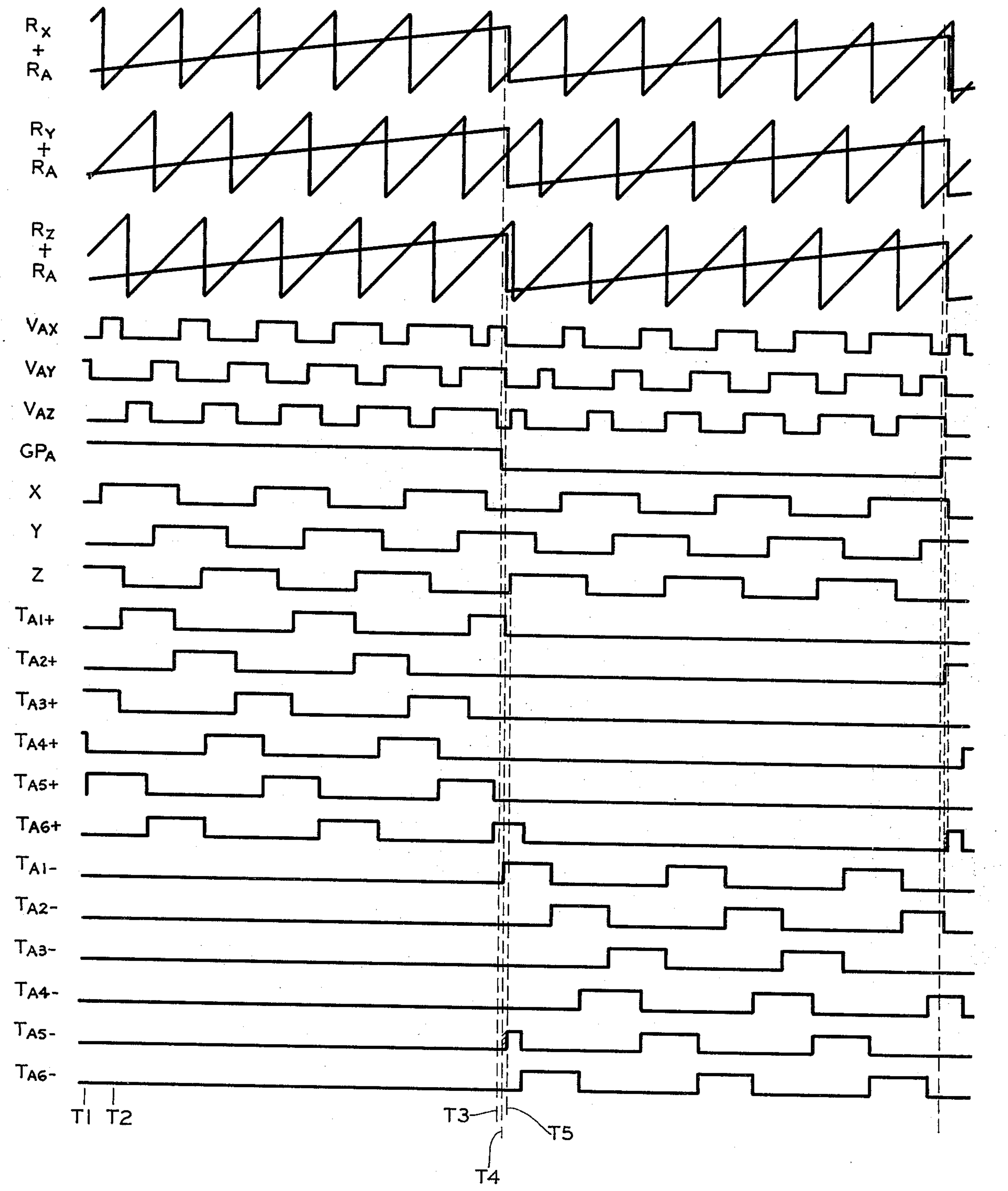
FIG. 4 is a diagram illustrating the voltage waveforms and their timed relationship developed by the logic system of FIG. 3.

The motor reference signal $R_A$ is compared with each of the source reference signals $R_X$, $R_Y$ and $R_Z$ in comparators 88, 90 and 92 respectively. The resulting logic signals $V_{AX}$, $V_{AY}$ and $V_{AZ}$ are illustrated in FIG. 4 and are in synchronism with the desired firing angles of the controlled rectifiers in the groups A+ and A−. The motor reference signal $R_B$ is compared with each of the source reference signals $R_X$, $R_Y$ and $R_Z$ in comparators 94, 96 and 98 respectively. The resulting logic signals $V_{BX}$, $V_{BY}$ and $V_{BZ}$ are in synchronism with the desired firing angles of the controlled rectifiers in the groups B+ and B−. The motor reference signal $R_C$ is compared with the source reference signals $R_X$, $R_Y$ and $R_Z$ in comparators 100, 102 and 104 respectively to generate logic signals $V_{CX}$, $V_{CY}$ and $V_{CZ}$ which are in synchronism with the desired firing angles of the controlled rectifiers in the groups C+ and C−.

The outputs of the comparators 88, 90 and 92 are supplied to a phase A trigger logic circuit 106, the outputs of the comparators 94, 96 and 98 are supplied to a phase B trigger logic circuit 108 and the outputs of the comparators 100, 102 and 104 are supplied to a phase C trigger logic circuit 110. The square wave signals X, Y and Z are each connected to the phase A, Band C trigger logics 106, 108 and 110. The group signal $GP_A$ is connected to the phase A trigger logic 106, the group signal $GP_B$ is connected to the phase B trigger logic 108 and the group signal $GP_C$ is connected to the phase C trigger logic 110.

The phase A trigger logic 106 processes the input signals thereto to obtain the trigger signals for the controlled rectifiers in the groups A+ and A− to generate the phase A alternating voltage applied to the phase winding 30-A of the induction motor 28. In like manner, the phase B trigger logic 108 and phase C trigger logic 110 process the respective signal inputs thereto and generate the tripper signals for the controlled rectifiers in the groups B+ and B− and C+ and C− respectively to generate the phase B and C alternating voltages applied to the phase windings 30-B and 30-C respectively. The periods of the phase A, B and C currents coincide respectively with the group signals $GP_A$, $GP_B$ and $GP_C$ and as such are 120° phase displaced from one another.

Figure 3:
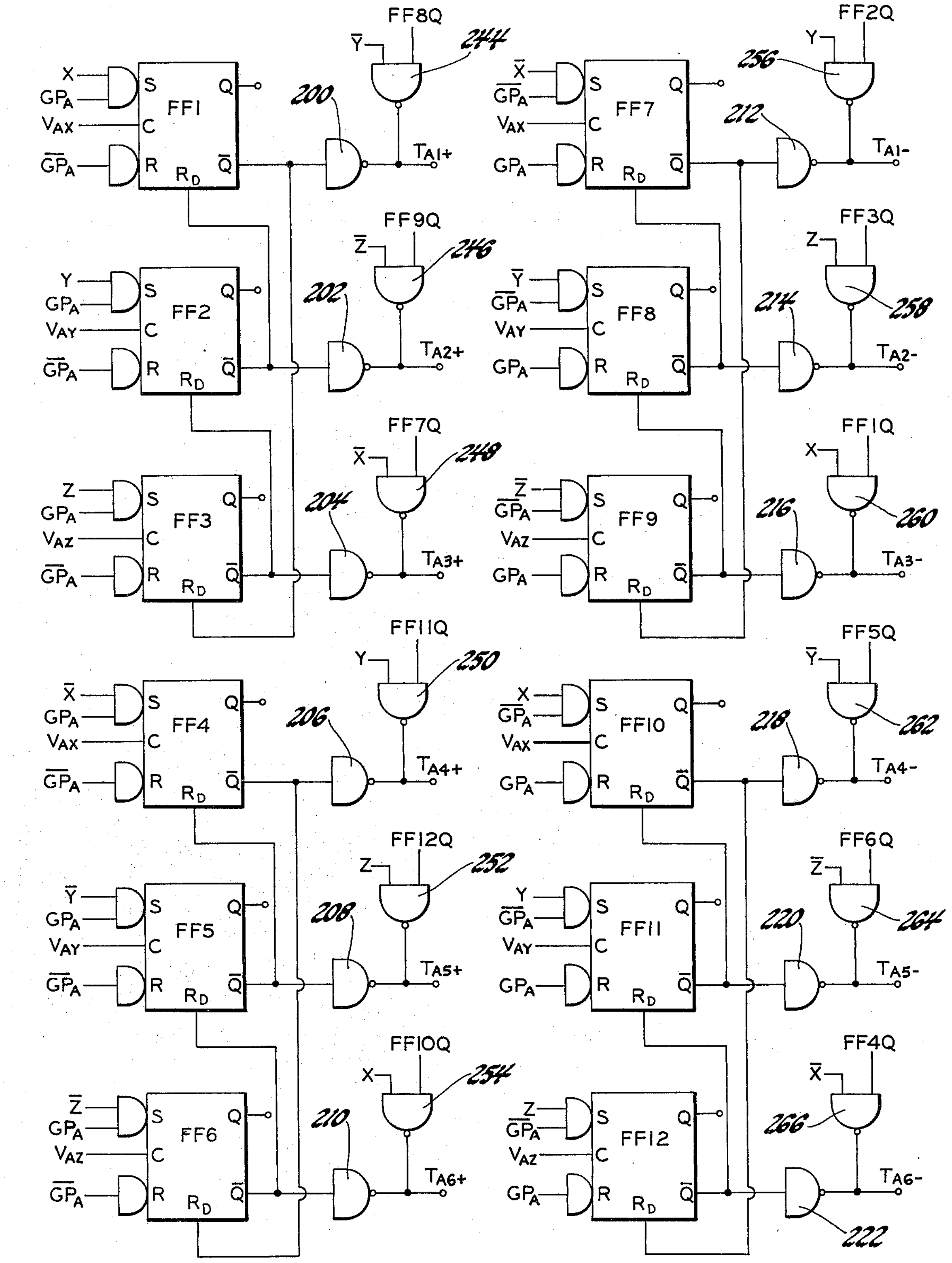
FIG. 3 is a circuit diagram of the trigger logic circuit associated with one of the phases of the cycloconverter output.

Referring to FIGS. 3 and 4, the phase A trigger logic circuit 106 includes a plurality of flip-flops FF1 through FF12. Each of the flip-flops includes a two input AND gate controlled set input, a clock input, a single input AND gate controlled reset input, a direct reset input, a Q output and a $\bar{Q}$ output. The flip-flops FF1 through FF12 are of the well-known type wherein the Q output is set to a logic 1 when the clock input changes from a logic 1 to a logic 0 while the set input is a logic 1. These flip-flops are also reset when the clock input changes from a logic 1 to a logic 0 while the reset input is a logic 1. Further, an input to the direct reset input changing from a logic 1 to a logic 0 resets the flip-flop.

The flip-flops FF1 through FF6 are enabled by the group signal $GP_A$ which is supplied to one input of the AND gate at the respective set inputs and the inverse of which is applied to the AND gate input of the respective reset inputs. While the group signal $GP_A$ is a logic 1, the flip-flops FF1 through FF6 are each set when the remaining input to the AND gate coupled to the set input of the flip-flops is a logic 1 and the clock input thereof changes from a logic 1 to a logic 0.

The signals X, Y and Z are supplied respectively to the remaining inputs of the AND gates at the set inputs of the flip-flops FF1 through FF3. The logic signals $V_{AX}$, $V_{AY}$ and $V_{AZ}$ are supplied to the respective clock inputs of the flip-flops FF1 through FF3. The $\bar{Q}$ output of flip-flop FF1 is coupled to the direct reset of the flip-flop FF3, the $\bar{Q}$ output of the flip-flop FF2 is coupled to the direct reset input of the flip-flop FF1 and the $\bar{Q}$ output of the flip-flop FF3 is coupled to the direct reset input of the flip-flop FF2. As can be seen, the flip-flops FF1 through FF3 are coupled in a ring counter configuration. For example, when flip-flop FF2 is set, the Q output thereof resets flip-flop FF1.

The flip-flops FF4 through FF6 are coupled in identical manner as the respective flip-flops FF1 through FF3 with the exception that the signals $\bar{X}$, $\bar{Y}$ and $\bar{Z}$ replace the respective signals X, Y and Z.

The $\bar{Q}$ output of the flip-flop FF1 is coupled to the input of a NAND gate 200 which functions as an inverter whose output constitutes the trigger signal for the controlled rectifier A1+ in group A+. In like manner, the $\bar{Q}$ outputs of the flip-flops FF2 through FF6 are coupled to respective NAND gates 202, 204, 206, 208 and 210 whose outputs constitute the trigger signals for the control rectifiers A2+, A3+, A4+, A5+ and A6+ respectively in group A+.

The flip-flops FF7 to FF12 are enabled when the group signal $GP_A$ is at a logic 0 by the coupling of the group signal $GP_A$ to the input of the AND gate at the reset inputs of the flip-flops FF7 through FF12 and the inverse thereof to one of the inputs of the AND gates at the set inputs thereof. As with flip-flops FF1 through FF6, the flip-flops FF7 through FF12 are set when the remaining input of the AND gate at the set inputs thereof is a logic 1 and the clock input changes from a logic 1 to a logic 0. The inputs to the AND gates at the set and reset inputs of the flip-flops FF7 through FF12 are the inverse of corresponding inputs of the flip-flops FF1 through FF6 respectively. The clock inputs of the flip-flops FF7 through FF12 are the same as the respective inputs of the flip-flops FF1 through FF6. In addition, the flip-flops FF7 through FF9 and the flip-flops FF10 through FF12 are coupled in a ring counter configuration as the flip-flops FF1 through FF3. The $\bar{Q}$ outputs of the flip-flops FF7 through FF12 are coupled to respective inputs of NAND gates 212, 214, 216, 218, 220 and 222. The outputs of the NAND gates 212 through 222 constitute the trigger signals for the controlled rectifiers A1− through A6− respectively in group A−.

As can be seen in FIG. 3, the flip-flops FF1 through FF6 are enabled to generate trigger signals for the controlled rectifier group A+ during the first 180° segment of the group reference signal $GP_A$ and the flip-flops FF7 through FF12 are enabled to generate trigger signals for the controlled rectifier group A− during the second 180° segment of the group signal $GP_A$. Further, the flip-flops FF1 through FF6 are selectively enabled by the square wave signals X, Y and Z either directly or inverted to generate trigger signals for the controlled rectifier group A+ as are the flip-flops FF7 through FF12 enabled thereby to generate trigger signals for the controlled rectifier group A−. Each of the trigger signals are coupled by conventional means such as pulse transformers to the control electrode of the respective controlled rectifier in groups A+ and A− which are gated conductive thereby.

Except as will hereinafter be described with respect to the inhibiting of the respective trigger signals for controlled rectifiers A1+ through A6+ and A1− through A6−, the controlled rectifiers in groups A+ and A− are selectively gated conductive to supply an alternating voltage to the phase winding 30-A as follows with reference to FIGS. 3 and 4. The motor reference signal $R_A$ is superimposed on each of the source reference signals $R_X$, $R_Y$ and $R_Z$ in FIG. 4 so as to clearly illustrate the function and outputs of the comparators 88, 90 and 92 of FIG. 1. Further, the motor reference signal $R_A$ is illustrated as a straight line approximation of the digital sawtooth waveforms of FIG. 2 for illustration purposes.

As seen in FIG. 4, the signals $V_{AX}$, $V_{AY}$ and $V_{AZ}$ are supplied by the comparators 88, 90 and 92 respectively, and become a logic 1 when the motor reference signal $R_A$ exceeds the magnitude of the source reference signals $R_X$, $R_Y$ and $R_Z$ respectively. These signals $V_{AX}$, $V_{AY}$ and $V_{AZ}$ and particularly their trailing edges, represent the trigger signals for the controlled rectifiers in groups A+ and A−.

Beginning at time T1 in FIG. 4, the group signal $GP_A$ is a logic 1 to enable the flip-flops FF1 through FF6 and disable the flip-flops FF7 through FF12. At time T1, $V_{AY}$ changes from a logic 1 to a logic 0 while square wave signal Y is a logic 0 to set flip-flop FF5 which resets flip-flop FF4 through the direct reset input thereof. The output of the NAND gate 208 shifts from a logic 0 to a logic 1 which constitutes the trigger signal for the controlled rectifier A5+ which is gated into conduction. At time T2, the signal $V_{AX}$ shifts from a logic 1 to a logic 0 while the square wave signal X is a logic 1. Consequently, the flip-flop FF1 is set which resets flip-flop FF3 to change the trigger signal for the controlled rectifier A3+, which was previously a logic 1, to a logic 0. Upon the setting of flip-flop FF1, the output of the NAND gate 200 changes from logic 0 to a logic 1 which constitutes the trigger signal for the controlled rectifier A1+. In the aforementioned manner, the flip-flops FF1 through FF6 are periodically set and reset to generate the trigger signals for the controlled rectifiers A1+ through A6+ in group A+ during the period that the group signal $GP_A$ is a logic 1 to supply 180° of the phase A voltage and current signals to the phase winding 30-A.

At time T3, the group signal $GP_A$ changes from a logic 1 to a logic 0 to enable the flip-flops FF7 through FF12 and disable the flip-flops FF1 through FF6. A short time thereafter, at time T4, the fast falling trailing edge of the motor reference signal $R_A$ occurs. Simultaneously therewith, the signals $V_{AX}$ and $V_{AY}$ which were each previously at logic 1 change to logic 0. As prior to time T4, flip-flop FF1 was set and since the inverse of group signal $GP_A$ is a logic 1 at time T4, the flip-flop FF1 is reset as the signal $V_{AX}$ changes from logic 1 to logic 0 to change the trigger signal for the control rectifier A1+ from logic 1 to logic 0. Since $V_{AZ}$ remains unchanged at logic 0 through time T3 and T4, the flip-flop FF6 remains set and the trigger signal for controlled rectifier A6+ remains at logic 1 in the new group.

Upon the shifting of the signal $V_{AX}$ from a logic 1 to a logic 0 at time T4, the flip-flop FF7 is set since its two set inputs are at logic 1. Consequently, the output of the NAND gate 212 changes from a logic 0 to a logic 1 to generate a trigger signal for the controlled rectifier A1− in group A−.

In the circuit previously described, the changing of the signal $V_{AY}$ from logic 1 to logic 0 at time T4 would set the flip-flop FF11 to generate a trigger signal for the controlled rectifier A5− at the output of the NAND gate 220. The fast falling trailing edge of the motor reference signal $R_A$ at time T4 results in the switching of the signals $V_{AX}$ and $V_{AY}$ from a logic 1 to a logic 0 and therefore the generation of trigger signals at the output of NAND gates 212 and 220 for controlled rectifiers A1− and A5−. These two trigger signals for A1− and A5− would have existed had the group signal $GP_A$ been a logic 0 for all times prior to T4 and if motor references $R_A$ had been equal to its value at T4 for all times prior to T4. Therefore, the fast falling trailing edge of the motor reference $R_A$ results in the generation of the proper triggers at time T4 for a smooth transition of lead current between controlled rectifier groups without erratic behavior since those controlled rectifiers at the beginning of a new group are triggered that would normally be conducting had this group always been conducting. However, if the controlled rectifier A5− were allowed to conduct for the case illustrated in FIG. 4, a short circuit condition would result between the controlled rectifiers A5− and A6+ since phase voltage y at the output of the winding 12 on conductor 22 is more positive than phase voltage z at the output of the winding 12 on conductor 24 as illustrated in FIGS. 1 and 2. As can be seen, this condition exists until time T5 at which time phase voltage z becomes more positive than phase voltage y and the square wave signal Z shifts from a logic 0 to a logic 1 at the output of comparator 74 of FIG. 1.

To prevent the short circuit between the controlled rectifiers A5− and A6+ and further to prevent all possible short circuits which could occur upon the transition between group A+ and A−, inhibiting circuits are provided in FIG. 3 for inhibiting the trigger signals during the time period that a possible short circuit condition exists.

The $\bar{Q}$ outputs of the flip-flops FF1 through FF6 or FF7 through FF12 which remain a logic 1 after a state change in the group signal $GP_A$ indicate which controlled rectifiers were last to be triggered in the previous group A+ or A−. In addition, the square wave signals X, Y and Z provide an indication of the line-to-line polarity of the voltages between the lines 20, 22, and 24. These signals are combined logically to generate inhibit signals for inhibiting those trigger signals which may cause short circuits.

As seen in FIG. 3, the inhibit circuits include NAND gates 244 through 266 whose outputs are connected respectively to the outputs of the NAND gates 200 to 222. To inhibit the trigger signal for the controlled rectifier A5− and thus prevent the short circuit condition illustrated in FIG. 4, the inverse of the square wave signal Z and the Q output of the flip-flop FF6 are applied to the inputs of the NAND gate 264 to maintain the trigger signal for the controlled rectifier at logic 0 while phase voltage y of phase winding 12 is more positive than phase voltage z during the generation of a trigger signal for the controlled rectifier A6+.

Referring to FIG. 3, at time T4 the inverse of the logic signal Z is a logic 1 and the Q output of flip-flop FF6 is also a logic 1. Consequently, the output of the NAND gate 264 is a logic 0 to inhibit the generation of the trigger signal for the controlled rectifier A5− until time T5 at which time the inverse of the square wave signal Z shifts to a logic 0 indicating the polarities of the voltages between the conductors 22 and 24 are no longer such as would create a short circuit between the control rectifiers A5− and A6+. Therefore, at time T5, the inhibit signal at the output of the NAND gate 264 is removed to permit the generation of the trigger signal for the controlled rectifier A5−. In like manner, the appropriate signals as indicated in FIG. 3 are applied to the inputs of the NAND gates 244 through 262 and 266 to prevent all other possible short circuits.

While the group signal $GP_A$ is a logic 0, the trigger signals for the controlled rectifiers A1− through A6− are generated in the same manner as the trigger signals for the controlled rectifiers A1+ through A6+ to supply the second 180° of the phase A current and voltage to the phase winding 30-A. As the group A+ and A− each are controlled during respective 180° segments of the group signal $GP_A$ and since the frequency of the group signal $GP_A$ is controlled by the slip frequency controller 62 to the desired frequency $F_{sync}$, the frequency of the voltage and current supplied to the coil 30-A by the groups A+ and A− is equal to the desired frequency $F_{sync}$.

The controlled rectifier groups B+ and B−, and C+ and C− are controlled in the same manner as the controlled rectifiers in groups A+ and A− in response to the motor reference signals $R_B$, $R_C$ and the group signals $GP_B$ and $GP_C$ to generate the phase B and C voltages and currents supplied to the respective phase coils 30-B and 30-C. As the motor reference signals $R_A$, $R_B$ and $R_C$ and the groups signals $GP_A$, $GP_B$ and $GP_C$ are displaced 120° from one another, the phase A, B and C voltages and currents supplied to the phase coils 30-A, 30-B and 30-C comprise a three-phase alternating voltage and current having a frequency determined by the motoring and braking programmer 62.

Reversal of the induction motor 28 has not been illustrated, it being obvious to one skilled in the art to provide a motor reverse signal in response to operator demand and appropriate logic to reverse the sequence of the phase B and C signals. In general, this is accomplished by interchanging the group signals $GP_B$ and $GP_C$ in the group control generator 66 and by interchanging motor reference signals $R_B$ and $R_C$. The interchanging could be done mechanically with relays but preferably it is accomplished electrically with logic gates.

The motor reference generator 68 comprising the sawtooth waveform generator of this invention is generally illustrated in FIGS. 5 through 7 with reference to the diagrams of FIGS. 8 and 9. Referring to the Figures, a divide by N counter 300 having outputs $\bar{Q}_1$ through $\bar{Q}_5$ has its $\bar{Q}_1$ and $\bar{Q}_2$ outputs coupled to respective inputs of a NAND gate 302 whose output is inverted by a NAND gate 304 and applied to its data input D so as to function as a divide by 3 counter. The output of the slip frequency controller 62 of FIG. 1, which is comprised of the voltage pulses having a frequency of $J(F_{sync})$ is coupled to the clock input of the counter 300. For purposes of illustration, it will be assumed that the constant J is equal to 360 so that the voltage pulses supplied to the clock input of the counter 300 has the frequency $360F_{sync}$. Therefore the $\bar{Q}_1$ output of the counter 300 is a signal having a frequency $120F_{sync}$ hereinafter referred to as $120F_{sync}$, $\bar{\phi}\mathbf{1}$. The inverted form of this signal is illustrated in FIG. 8*a*. The counter 300 may take the form of the digital integrated circuit model CD 4018A manufactured by RCA, Solid State Division, Box 3200, Somerville, N.J. 08876.

The $120F_{sync}$, $\bar{\phi}\mathbf{1}$ signal is coupled to the clock input of a divide by N counter 306 and the clock inputs of a divide by 10 counter 308 and a divide by 10 counter 310. The divide by N counter 306 is identical to the divide by N counter 300 and is coupled into a divide by 6 configuration by feeding back the $\bar{Q}_3$ output thereof, hereinafter referred to as $20F_{sync}$, $\phi\mathbf{3}$, to the data input thereof. The $\bar{Q}_1$ output of the counter 306, hereinafter referred to as $20F_{sync}$ $\phi\mathbf{1}$, and the $20F_{sync}$, $\phi\mathbf{3}$ signal are coupled to respective inputs of a NAND gate 312 whose output is coupled to the clock enable input of the counter 308. The clock enable of the counter 310 is grounded.

The counters 308 and 310 are enabled when the clock enable inputs thereof are grounded. The divide by 10 counter 308 functions in response to the enabling signal output of the NAND gate 312 and the signal $120F_{sync}$, $\bar{\phi}\mathbf{1}$ to sequentially supply decoded decimal outputs on 10 output lines with each output shifting to a logic 1 during a respective decimal time slot. The output signal on each of the respective lines has a frequency equal to $2F_{sync}$, each being identified respectively by $\phi 1$ through $\phi 10$. In like manner, the counter 310 functions to divide the $120F_{sync}$, $\phi 1$ signal by 10 and supplies 10 sequential decoded decimal outputs having respective decimal time slots, each output being identified respectively as $\bar{\phi}1$ through $\phi 10$ and each having a frequency equal to $12F_{sync}$. Both counters 308 and 310 change state on the falling edge of signal $120F_{sync}$, $\phi 1$ as shown in FIG. 8. The counters 308 and 310 may take the form of the digital integrated circuit model CD 4017A manufactured by RCA, Solid State Division, Box 3200, Somerville, N.J. 08876.

To synchronize the operation of the group control generator 66 and the motor reference generator 68, the group signal $GP_A$ is applied to the input of a pulse generator 314 which generates a sync pulse Sy at each positive transition of the $GP_A$ signal. The sync pulses Sy are coupled to the reset inputs of the counters 306, 308 and 310 which are reset thereby. The sync pulses $S_y$ are redundant after the first cycle since the counters will count end-around on a synchronized basis thereafter.

The $2F_{sync}$, $\phi 3$ signal from the counter 308 is supplied to one input of a NAND gate 316 of a flip-flop 318. The $2F_{sync}$, $\phi 9$ signal from the counter 308 is supplied to one input of a NAND gate 320 of the flip-flop 318. The $12F_{sync}$, $\phi 7$ signal from the counter 310 is coupled to a second input of the NAND gate 316. The MOTOR/BRAKE signal on conductor 63 from the motoring and braking control circuit 64 of FIG. 1 is coupled to a third input of the NAND gate 316, the second input of the NAND gate 320 and to an input of a NAND gate 322 of the flip-flop 318. The output of the NAND gate 316 is coupled to a second input of the NAND gate 322 and the output of the NAND gate 320 is coupled to an input of a NAND gate 324 in the flip-flop 318. The outputs of the NAND gates 322 and 324 are cross coupled to respective inputs thereof to complete the flip-flop configuration.

The output of the flip-flop 318 is a digital phase A count-up signal CUA which is applied to the data input of the first section of a shift register 326 and an input of a NAND gate 328. The shift register 326 is comprised of four sections of four stages each with the output of the last stage in each section being coupled to the data input of the following section. The output of the last stage in the shift register 326 is coupled to the data input of the first section of an identical shift register 330, the output of the last stage of which is coupled to the data input of the first section of a shift register 332 again identical to the shift register 326.

The $120F_{sync}$, $\bar{\phi}1$ signal is inverted by a NAND gate 334 and supplied to respective clock inputs of the shift registers 326, 330 and 332. The output of the first section of the shift register 330 comprises a digital phase C count-up signal CUC which is coupled to a respective input of a NAND gate 335 and the output of the second section of the shift register 332 comprises a digital phase B count-up signal CUB which is coupled to a respective input of a NAND gate 336. The $120F_{sync}$, $\phi 1$ signal at the output of the NAND gate 334 is coupled to respective inputs of the NAND gates 328, 335 and 336.

The signal CUA is generated by setting and resetting the flip-flop 318 at the appropriate times during each half cycle of motor phase A as shown in FIG. 8. The signals CUB and CUC are generated by delaying CUA by 120° and 60°, respectively, with the use of shift registers 326, 330 and 332.

Each of the shift registers 326, 330 and 332 may take the form of the digital integrated circuit model CD 4006A manufactured by RCA, Solid State Division, Box 3200, Somerville, N.J. 08876.

When motoring, the MOTOR/BRAKE signal on conductor 63 from the motoring and braking control 68 is a logic 1, and the counters 306, 308 and 310, the flip-flop 318, and the shift registers 326, 330 and 332 function to generate the logic signals CUA, CUB and CUC during the respective group signals $GP_A$, $GP_B$ and $GP_C$ phase displaced from one another as illustrated in FIG. 8*a*. When the signal CUA is at logic 1, the NAND gate 328 supplies a series of clock pulses CLK-A at a frequency equal to $120F_{sync}$. In like manner the NAND gates 335 and 336 function to generate respective series of clock pulses CLK-B and CLK-C during the time period that the CUB and CUC signals are at logic 1.

If the MOTOR/BRAKE signal from the motoring and braking control 68 is a logic 0, indicating braking of the induction motor 28 of FIG. 1, the output of the NAND gate 322 of the flip-flop 318 is a constant logic 1. Consequently, the CUA, CUB and CUC signals all shift to and remain at a logic 1 and the CLK-A, CLK-B and CLK-C signals are generated without interruption.

Referring to FIG. 6, the $12F_{sync}$, $\phi 1$ signal from counter 310 is inverted by a NAND gate 338 whose output is coupled to respective inputs of NOR gates 340, 342 and 344. The signals $2F_{sync}$, $\phi 1$, $2F_{sync}$, $\phi 4$ and $2F_{sync}$, $\phi 7$ from counter 308 are connected to second inputs of NOR gates 340, 342 and 344, respectively. The output of the NOR gates 340, 342 and 344 comprise the pulses PRESET A, PRESET C and PRESET B as illustrated in FIG. 8*a*, each occurring with each state change of the respective group signal $GP_A$, $GP_C$ and $GP_B$.

Referring to FIG. 7, a pair of counters 346 and 348 are serially connected and function to count pulses supplied to the clock inputs thereof and supply on respective output lines a 6-bit, binary indication of the number of pulses counted. These output lines are coupled to respective inputs of an inverter 349. The CLK-A signal is supplied to the clock inputs of the counters 346 and 348, the MOTOR/BRAKE signal is coupled to selected preset inputs of the counters 346 and 348 and the PRESET A signal is coupled to the preset enable inputs of the counters 346 and 348. A positive voltage V+ from a suitable power supply is coupled to the counters 346 and 348.

During motoring, the MOTOR/BRAKE signal is a logic 1 and upon the occurrence of the PRESET A signal, the counters 346 and 348 are set to a preselected number designated at the J1, J2, J3 and J4 jam inputs. When the CUA signal changes to logic 1, the CLK-A pulses are supplied to the clock inputs of the counters 346 and 348 which in turn generate a binary indication on the output lines thereof representing the sum of the number of pulses supplied thereto and the preset number. The inverter 349 functions to invert the respective outputs of the counters 346 and 348 and supplies the inverted signals to a digital-to-analog converter 350. Each of the counters 346 and 348 may take the form of the digital integrated circuit model CD 4029A manufactured by RCA, Solid State Division, Box 3200, Somerville, N.J. 08876.

Assuming a maximum count of 63 by the counters 346 and 348, the output of the digital-to-analog converter 350 is a current defined by the expression $$I_1 = -V_G K_1 N \quad (1)$$

where $K_1$ is a constant, $V_G$ is the magnitude of the gain control voltage coupled to the digital-to-analog converter 350 through the resistor 352 from the conductor 65 and $N$ is the number stored in the counters 346 and 348. This output is coupled to the negative input of an operational amplifier 354 having a feedback resistor 355 with a resistance $R_F$. As the counter 346 and 348 count the input pulses supplied thereto, the output of the digital-to-analog converter 350 is a negative increasing stepped current waveform having a magnitude represented by equation (1) which is converted to a positive increasing stepped voltage $R_A$ by the amplifier 354. The magnitude of each of the stepped increments and consequently the magnitude of the current $I_1$ and voltage $R_A$ can be directly controlled by varying the magnitude $V_G$ of the gain control voltage applied to the gain adjustment resistor 352. The digital-to-analog converter 350 may take the form of model MC 1406L manufactured by Motorola, Box 20912, Phoenix, Ariz. 85036.

The gain control voltage having the magnitude $V_G$ represents a specific braking or motor command on the conductor 65 from the motoring and braking control 64 is coupled to the digital-to-analog converter 350. This gain control voltage is effective for controlling the gain of the digital-to-analog converter 350.

The gain control signal on conductor 65 is further coupled to ground across a potentiometer 364 whose wiper arm is coupled to a buffer amplifier 366 having unit gain. The output of the amplifier 366 is coupled to the negative input of the operational amplifier 354 through a resistor 368 having a resistance $R_2$. The current input to the operation amplifier 354 from the amplifier 366 is defined by the expression $$I_2 = (K_2 \, V_G)/R_2 = K_3 \, V_G \tag{2}$$

where $K_2$ is a constant determined by the setting of the potentiometer 364, $R_2$ is the resistance of the resistor 368, $K_3 = K_2/R_2$ and $V_G$ is the magnitude of the gain control voltage.

A potentiometer 370 is coupled between the source of negative voltage V− and ground and supplies a negative current to the negative input of the operational amplifier 354 through a resistor 371 having a resistance $R_3$. The current supplied to the operational amplifier 354 from the potentiometer 370 is defined by the expression $$I_3 = -\frac{K_4}{R_3} = -K_5 \tag{3}$$

where $K_3$ is a constant determined by the setting of the potentiometer 370, $R_3$ is the resistance of the resistor 371 and $K_5$ is a constant.

The output of the operational amplifier is the motor reference signal $R_A$ which has an amplitude defined by the expression $$R_A = -R_F\,(I_1 + I_2 + I_3)$$
$$= V_G\,(R_F\,K_1\,N - R_F\,K_3) + R_F\,K_5 \tag{4}$$

For a given setting of the potentiometer 364 establishing a particular valve of $K_3$, the expression within the brackets of equation (4) goes to zero for a specific count output of the counters 346 and 348 for all values of $V_G$. This point will hereinafter be referred to as the zero gain point for the motor reference signal $R_A$. At that count, the motor reference signal $R_A$ is equal to the expression $R_F\,K_5$ of equation (4), the magnitude of which is controlled by adjusting the magnitude of $K_5$ with the potentiometer 370. As can be seen from equation (4), the expression $R_F\,K_5$ functions to establish a bias for the curve established by the expression $V_G(R_F\,K_1\,N - R_F\,K_3)$.

The generation of the motor reference signal $R_A$ will now be described with reference to FIGS. 7 and 8. Assuming the MOTOR/BRAKE signal is a logic 1 representing motoring, upon the occurrence of the signal PRESET A, the counters 346 and 348 are preset to a preselected value which may be, for example, 11. The counters 346 and 348 remain in this state until the count-up signal CUA shifts to a logic 1 to enable the NAND gate 328 of FIG. 5 to supply the signal CLK-A at the frequency $120F_{sync}$ to clock the counters 346 and 348. Thereafter, the output of the counters 346 and 348 is a binary representation of the number of pulses supplied thereto plus the initial preset value. With each pulse counted by the counters 346 and 348, the digital-to-analog converter 350 increases the magnitude of the signal supplied to the operational amplifier 354 by a value determined by the magnitude $V_G$ of the gain control. As seen in FIG. 8a, it is assumed that the magnitude $V_G$ of the gain control voltage, the outputs of the voltage dividers 364 and 370 are such that with the count of 11 preset into the counters 346 and 348, the output of the operational amplifier 354 is equal to 0.25 volts. The output current from the digital-to-analog converter 350 continues to increase in stepwise manner in accordance with each count of the counter 346 and 348 and the magnitude $V_G$ of the gain control voltage until the CUA signal shifts to logic 0 to inhibit the NAND gate 328 from generating the CLK-A pulses. As seen in FIG. 8*a*, the magnitude of the output of the operational amplifier 354 in the specific example is at this time equal to 4.25 volts. Upon the occurrence of the next pulse PRESET A, the counters 346 and 348 are preset and the cycle is repeated. The resulting waveform is the desired truncated sawtooth waveform for controlling the firing angle delay of the control switches in the groups A+ and A− during motoring.

To provide for braking, the vehicle operator causes the motoring and braking control 68 to supply a logic 0 to the preset inputs of the counters 346 and 348 and also to cause the signals CUA, CUB and CUC to be maintained at a logic 1 as previously described so as to continually maintain the NAND gates 328, 334 and 336 enabled to supply the respective output clock pulses CLK-A, CLK-B and CLK-C. Consequently, upon the occurrence of the pulse PRESET A, the counters 346 and 348 are reset to 0 and, after the pulse PRESET A changes to a logic 0, the counters 346 and 348 begin to count the CLK-A pulses. Also upon generating the logic 0 MOTOR/BRAKE signal, the vehicle operator causes the motoring and braking control 68 to decrease the magnitude $V_G$ of the gain control voltage to reduce the gain of the digital-to-analog converter 350 to effect the decrease of the magnitude of each incremental step of the output waveform thereof. The output of the operational amplifier 354 continues to increase in stepwise fashion until the next pulse PRESET A at which time the counters 346 and 348 are again set to 0 after which the cycle is then repeated. The resulting signal is the conventional sawtooth waveform illustrated in FIG. 8*b* varying in amplitude from 1.0 volts to 4.0 volts. Due to the time delay through the various circuit elements, the trailing edge of the motor reference signal $R_A$ occurs after the state change of the group signal $GP_A$.

Referring to FIGS. 9*a* and 9*b*, one of the significant features of the motor reference generator 68 will be described. For a given setting of the potentiometer 364, the zero gain point for the motor reference signal $R_A$ is established about which the motor reference signal $R_A$ can be compressed or expanded by varying the gain control voltage $V_G$. In FIG. 9a, the sawtooth waveform 372 is shown for one specific magnitude $V_G$ of the gain control voltage and the curve 374 is a sawtooth waveform shown with a decreased magnitude $V_G$ of the gain control voltage. As can be seen by the FIG. 9a, the point of intersection of the curves 372 and 374 at point 376 is established by the potentiometer 364 and remains constant for all values of $V_G$. In this manner, the range of trigger delay angles of the controlled switches in groups A+ and A− can be varied so as to control the amplitude of the phase A signal to the induction motor winding 30-A. Although FIG. 9a illustrates the motor reference signal $R_A$ during braking, it is applicable also to the truncated sawtooth waveform generated for motoring. Further, the curves may be biased upward or downward by varying the setting of potentiometer 370.

FIG. 9b illustrates the motor reference signal $R_A$ for a second setting of the potentiometer 364 with two magnitudes of gain control voltage. The sawtooth waveform 378 is established by a first magnitude $V_G$ of the gain control voltage and the sawtooth waveform 380 is established by a second magnitude of the gain control voltage. As can be seen, the point of intersection 382 of the sawtooth waveforms 378 and 380 is shifted as a function of the potentiometer 364 and remains constant for that setting. In the foregoing manner, the zero gain point for the motor reference signal $R_A$ can be established about which it may be compressed or expanded. Further, by varying the potentiometer 370, the sawtooth waveforms 372 through 380 can be biased up or down without altering the relative intersection points 376 and 382.

The motor reference signals $R_B$ and $R_C$ are generated by the $R_B$ and $R_C$ reference generators 384 and 386 in identical manner as the motor reference signal $R_A$ in response to the pulses PRESET B and PRESET C and the clock signals CLK-B and CLK-C which establish the desired phase relationships between the motor reference signals $R_A$, $R_B$ and $R_C$.

Due to the absence of timing elements in the motor reference generator 68, the generator is not frequency dependent and can operate to generate true sawtooth waveforms at all speeds of the induction motor 28 down to zero speed. Further, since the gain control voltage is applied to all three reference generators $R_A$, $R_B$ and $R_C$, the amplitudes of all three reference signals are controlled simultaneously. The nature of this circuit is such that $R_A$, $R_B$ and $R_C$ can be identical in shape and amplitude, can be exactly 120° apart, can be controlled together as one with respect to shape and amplitude, and can have very low drift since amplitudes are determined by digital signals and only a few resistor ratios.

The detailed description of the preferred embodiment of this invention for the purpose of explaining the principles thereof is not to be considered as limiting or restricting the invention, since many modifications may be made by the exercise of skill in the art without departing from the scope of the invention.

What is claimed is:

1. A digital sawtooth waveform generator comprising: means for generating a series of clock pulses; means for generating a series of recurring preset pulses; counting means for receiving said series of clock pulses and recurring preset pulses and counting said clock pulses between preset pulses to provide a digital signal representing the number of clock pulses counted thereby between preset pulses; means for generating a gain control signal having a magnitude $V_G$; a variable gain digital-to-analog converter for receiving the digital signal and the gain control signal and supplying a first signal having a magnitude equal to the product of $V_G$, N and a first constant where N is the count represented by the digital signal; means for generating a second signal having a magnitude equal to the product of $V_G$ and a second constant, the second signal having a polarity opposite to the polarity of the first signal; and means for summing the first and second signals, whereby the summation is a digital sawtooth waveform which is compressed or expanded about a particular count N equal to the second constant divided by the first constant as the magnitude $V_G$ of the gain control signal is varied.

2. A digital sawtooth waveform generator comprising: means for generating a series of clock pulses having a frequency defined by the expression JF where J is a constant and F is a desired frequency of the sawtooth waveforms; means for generating a series of preset pulses at the frequency F; a digital counter for receiving the preset and clock pulses and generating a digital number representing a totalized count, the totalized count being equal to the sum of a preset number and the number of clock pulses received by the digital counter following a preset pulse; means for generating a gain control signal having a magnitude $V_G$; a variable gain digital-to-analog converter for receiving the digital signal and the gain control signal and supplying a first output signal having a magnitude equal to the product of $V_G$, N and a first constant where N is the magnitude of the totalized count; means for generating a second output signal having a magnitude equal to the product of $V_G$ and a second constant, the second output signal having a polarity opposite to the polarity of the first output signal; and means for summing the first and second output signals, whereby the summation is a digital sawtooth waveform which is compressed or expanded about a preselected totalized count N equal to the second constant divided by the first constant as the magnitude $V_G$ of the gain control signal is varied.

3. A digital sawtooth waveform generator comprising: means for generating a series of clock pulses having a frequency defined by the expression JF where J is a constant and F is a desired frequency of the sawtooth waveforms; means for generating a series of preset pulses at the frequency F; a digital counter for receiving the preset and clock pulses and generating a digital number representing a totalized count, the totalized count being equal to the sum of a preset number and the number of clock pulses received by the digital counter following a preset pulse; means for generating a gain control signal having a magnitude $V_G$; a variable gain digital-to-analog converter for receiving the digital signal and the gain control signal and supplying a first signal having a magnitude equal to the product of $V_G$, N and a first constant where N is the magnitude of the totalized count; means for generating a second signal having a magnitude equal to the product of $V_G$ and a second constant, the second signal having a polarity opposite to the polarity of the first signal; means for generating a third signal having a magnitude equal to a third constant; and means for summing the first, second and third signals, whereby the summation is a digital sawtooth waveform which is compressed or expanded about a preselected totalized count N equal to the second constant divided by the first constant as the magnitude $V_G$ of the gain control signal is varied and whereby the amplitude of the summation is equal to the third constant when the totalized count is equal to the preselected totalized count for all values of the magnitude $V_G$.

* * * * *